(12) United States Patent
Cowley

(10) Patent No.: US 7,200,516 B1
(45) Date of Patent: Apr. 3, 2007

(54) ALIGNMENT ACCESSORY FOR PORTABLE DRILLS AND THE LIKE

(76) Inventor: Brian J. Cowley, 2 Bilgola Terrace, Bilgola Beach, NSW (AU) 2107

( * ) Notice: Subject to any disclaimer, the term of this patent is extended or adjusted under 35 U.S.C. 154(b) by 0 days.

(21) Appl. No.: 11/238,692

(22) Filed: Sep. 30, 2005

(51) Int. Cl.
 *G01C 9/00* (2006.01)
(52) U.S. Cl. ............ 702/151; 702/159; 356/138; 356/400
(58) Field of Classification Search ........ 702/150–154, 702/158, 159, 166; 33/700, 707; 356/138, 356/139.04–139.06, 141.5, 634, 399, 400; 408/16
See application file for complete search history.

(56) References Cited

U.S. PATENT DOCUMENTS

| | | | |
|---|---|---|---|
| 2,822,615 A * | 2/1958 | Durst et al. ............ | 33/286 |
| 4,375,341 A | 3/1983 | Schulze | |
| D280,796 S | 10/1985 | Somers | |
| 4,765,786 A | 8/1988 | Krogh | |
| 5,797,670 A * | 8/1998 | Snoke et al. ............ | 362/119 |
| 6,244,086 B1 | 6/2001 | Hopf et al. | |
| 6,247,879 B1 | 6/2001 | Costa | |
| 6,375,395 B1 * | 4/2002 | Heintzeman ............ | 408/16 |
| 2004/0022593 A1 | 2/2004 | Dionysian et al. | |
| 2004/0136796 A1 * | 7/2004 | Chen .................... | 408/16 |
| 2004/0252293 A1 * | 12/2004 | Laver et al. ............ | 356/138 |

FOREIGN PATENT DOCUMENTS

JP 63173323 A * 7/1988

\* cited by examiner

*Primary Examiner*—Manuel L Barbee

(57) ABSTRACT

An apparatus includes a strap that is positional about a drill and maintains a static relationship therewith while a drill bit and chuck rotate. The apparatus includes a plurality of light sources and sensors. The light sources and sensors face forwardly and emit corresponding light arrays aligned parallel to the drill bit and measure a linear distance to a target surface respectively. Each light source defines a reflection that has a unique diameter when the drill is not perpendicular, notifying the user to adapt the drill such that identical diameters are reflected on the work surface. A mechanism communicates an output signal to a display screen so that a visual representation of the drill bit location becomes displayed on a display screen. The drill bit is aligned perpendicular to the work surface when the light sources are equidistantly spaced from the work surface.

19 Claims, 3 Drawing Sheets

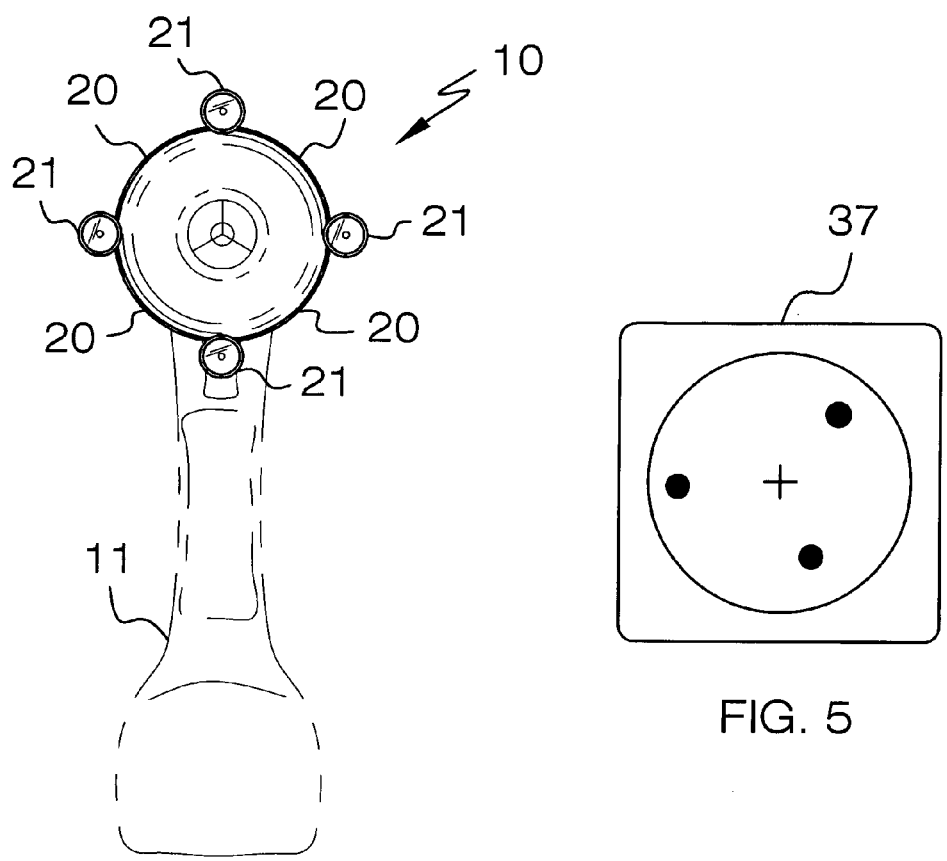
FIG. 3
FIG. 5
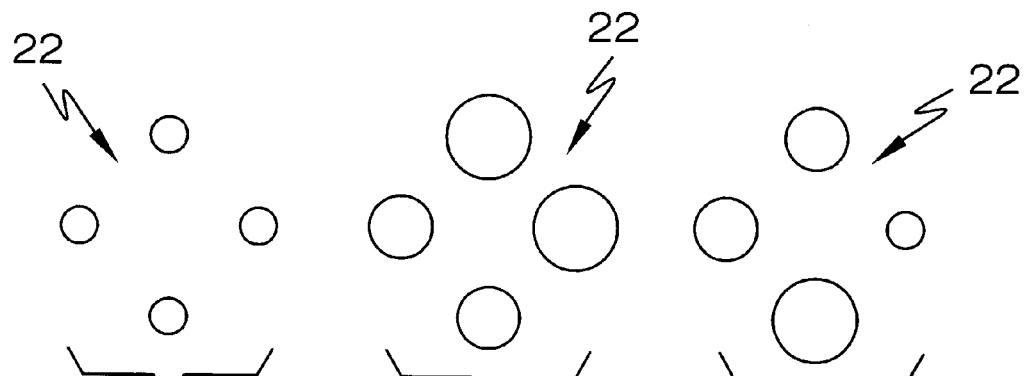
FIG. 4a  FIG. 4b  FIG. 4c

ALIGNMENT ACCESSORY FOR PORTABLE DRILLS AND THE LIKE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to alignment accessories and, more particularly, to an alignment accessory for portable drills and the like.

2. Prior Art

The prior art shows a wide variety of devices for guiding hand-held electric drills. One common type of guide device acts by constraining the drill bit itself. Many of the guides of this type employ bushings to hold the bit. Such guides can only be used with drill bits that fit the bushings provided. Another drawback is that extra-long bits are often called for, since they must be long enough to pass through the bushing and still drill a sufficiently deep hole.

Another common type of drill guide is that in which the drill is affixed to a moveable stage or rod whose motions are guided. Many of the guides in this category offer a variety of features. However, affixing the drill to the stage can be a difficult and time consuming process. Two popularly used guides from this group offer a number of useful features and also have simple designs which can be manufactured economically.

To use either of these devices, the chuck is removed from the drill and screwed onto one end of the device, while the body of the drill is screwed onto the other. However, chuck removal can be a difficult process. To loosen a standard drill chuck, the chuck key is inserted and banged sharply with a mallet or piece of wood. The user must be aware that the chuck has a reverse thread. With reversing drills, it is also necessary to remove a reverse-threaded screw inside the chuck. Also, not infrequently, chucks become jammed and refuse to loosen. Once the guided holes have been made it may then be necessary to remove the drill from the guide and reassemble it. Consequently, the use of these guides may not be worthwhile when only a small number of guided holes are to be drilled. Furthermore, is difficult to drill along vertical surfaces with such a guide.

The prior art discloses another guide which has a number of useful features and does not require that the drill be affixed to a moving stage. With this device, a specially designed cylindrical drill is set up simply by inserting it into a tubular guide. The drill is then guided by a sliding action. However, unlike an ordinary drill, where the grip projects from the side, this drill has a "saw-type" handle attached to the end, where it will not interfere with the guide tube. The cylindrical drill housing also appears bulkier than that of an ordinary drill, to the extent that a user probably could not wrap his or her hand around it. These factors would make the drill difficult to handle when drilling holes without the guide.

Such a guide is apparently constructed of an opaque material, providing "a window (opening) through which the tip of the drill bit may be visually observed". This type of construction would interfere with the illumination of the work piece and would only permit viewing from a certain angle. This arrangement also fails to provide eye protection, since there is no protective transparent material directly between the viewer's eye and the drill bit. The guide also includes two retractable legs which may be extended to tilt the guide for drilling angled holes. While this is a useful feature, it would be preferable if only a single member required adjustment for drilling angles. The patent also notes that longer bits may be required for drilling angled holes.

Accordingly, a need remains for an alignment accessory for portable drills and the like in order to overcome the above-noted shortcomings. The present invention satisfies such a need by providing a drill alignment accessory that is easy and convenient to use, accurate, provides time and cost savings, and results in an improved job quality. Such an alignment accessory ensures that the drill remains perpendicularly positioned to the work surface for an effortlessly and straight drilled hole. The alignment accessory for portable drills and the like can be utilized by commercial workers such as trades people, construction laborers, and general maintenance personnel. Do-it-yourself enthusiasts can also benefit from the use of the alignment accessory.

BRIEF SUMMARY OF THE INVENTION

In view of the foregoing background, it is therefore an object of the present invention to provide an alignment accessory for portable drills and the like. These and other objects, features, and advantages of the invention are provided by an apparatus for assisting a user to operate a portable power tool.

The apparatus includes an annular strap that has a continuous and unitary length removably positional about a selected portion of the power tool. Such a strap maintains a static relationship with the power tool while a drill bit and chuck rotate along an axis centrally aligned with a perimeter of the strap during operating conditions. The strap may be formed from elastic material such that the apparatus can conveniently be adjustably positioned about various-sized power tools.

A plurality of light-emitting sources are directly conjoined to the strap and protrude outwardly therefrom such that the light-emitting sources become equidistantly positioned about the outer perimeter of the strap. Such light-emitting sources are directly engaged with the selected portion of the power tool during operating conditions. The light-emitting sources face forwardly and emit a plurality of corresponding light arrays aligned parallel to the drill bit such that the light arrays reflect off a planar work surface being drilled by the power tool. Such light-emitting sources may be concentrically spaced about the chuck and positioned proximal to the drill bit. The light-emitting sources are preferably positioned distally from the trigger of the power tool. Each light array is preferably situated in a unique quadrant defined about the drill bit.

A mechanism is included for electrically mating each of the light-emitting sources to a power supply source of the drill bit in such a manner that the light-emitting sources advantageously automatically toggle between on and off positions when the user activates a trigger of the power tool. The light-emitting sources are simultaneously activated and deactivated by such an electrical mating mechanism. The electrically mating mechanism preferably includes a switch and a plurality of electrical leads directly conjoined to the switch and the power supply source. Such electrical leads are connected in parallel to the power supply source such that a defective one of the light-emitting sources advantageously will not render remaining ones of the light-emitting sources defective during operating conditions.

A plurality of sensors are electrically coupled to the light-emitting sources respectively. It is noted such sensors may include conventional sensors well known in the industry such as optical sensors, infra-red sensors and ultrasonic sensors, for example. The sensors measure a linear distance defined between the light-emitting sources and a target surface. Based upon the measured distances, the sensors generate a plurality of control signals corresponding to distance values defined therebetween. In an optimum operating condition, the power tool is centrally and orthogonally aligned with the target surface when the distance values are equal.

The present invention further includes a mechanism for visually displaying a position of a drill bit of the power tool in such a manner that the user can quickly and efficiently align the drill bit with the target surface during operating conditions. Such a position displaying mechanism includes at least one display screen connected to a portion of the power tool, a processor and a memory electrically coupled to the processor.

The memory includes software instructions for causing the power tool to display the interrelationship of the distance values on the display screen wherein the software instructions performs the steps of: calculating a distance value from each sensor to the target surface; performing an arithmetic algorithm with the distance values; determining a position of the drill bit based upon an end value resulting from the arithmetic algorithm; and generating an output signal corresponding to a geometric location of the drill bit defined along an x-axis, y-axis and z-axis. The mechanism further includes a signal interface circuit electrically coupled to the processor and the display screen. Such a signal interface circuit translates and communicates the output signal to the display screen so that a visual representation of the drill bit location becomes displayed on the display screen.

When activated, each light array defines a reflection that has a unique diameter on the planar work surface when the power tool is not aligned perpendicular thereto and thereby advantageously and effectively notifies the user to adapt an angle of the power tool such that each light array reflects a substantially identical diameter on the planar work surface. The drill bit is effectively and conveniently aligned perpendicular to the planar work surface when the light-emitting sources are equidistantly spaced from the planar work surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a front-elevational view of the apparatus shown in FIG. 1;

FIG. 4a is front-elevational view of the light arrays shown in FIG. 1, showing the light arrays with a preferred equal diameter and spacing;

FIG. 4b is a front-elevational view of the light arrays shown in FIG. 1, showing the light arrays with unequal diameters for notifying the user that the drill is not perpendicularly aligned with the work surface;

FIG. 4c is a front-elevational view of the light arrays shown in FIG. 1, showing the light arrays with unequal diameters for notifying the user that the drill is not perpendicularly aligned with the work surface;

FIG. 5 is a rear-elevational view of the power tool shown in FIG. 1; and

DETAILED DESCRIPTION OF THE INVENTION

Figure 1:
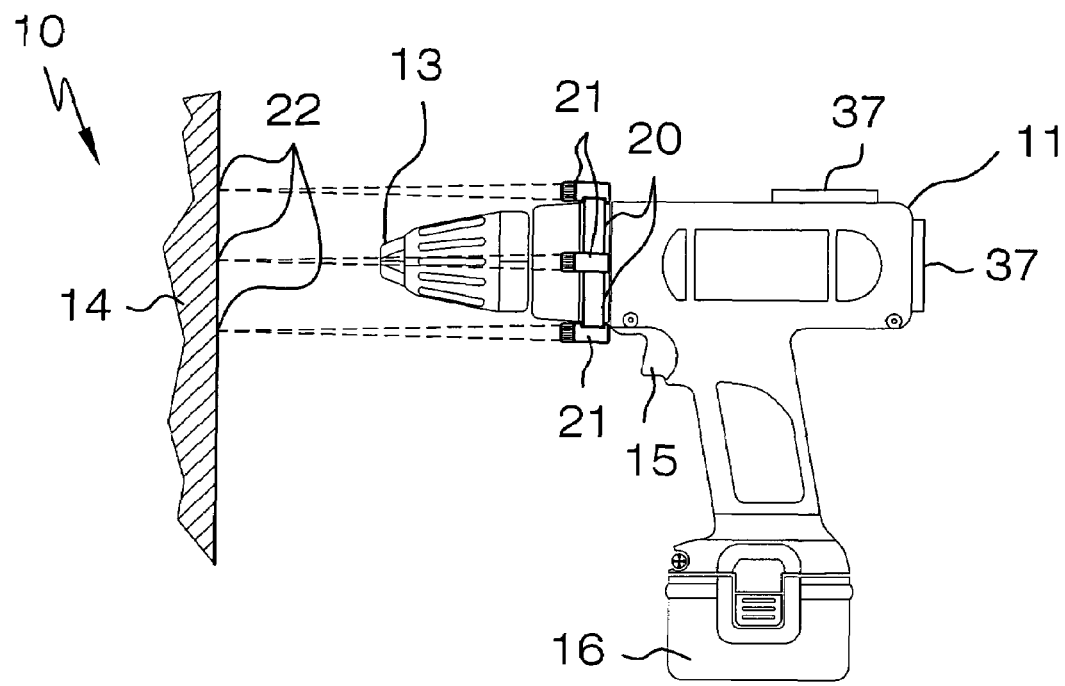
FIG. 1 is a side-elevational view showing an alignment accessory for portable drills and the like, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–5 by the reference numeral 10 and is intended to provide an alignment accessory for portable drills and the like. It should be understood that the apparatus 10 may be used to align many different types of drills and tools and should not be limited in use to only portable drills.

Figure 2:
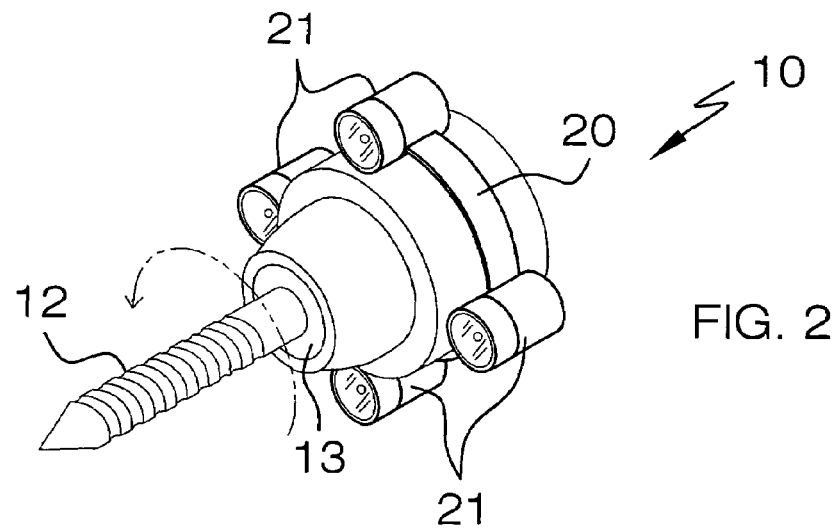
FIG. 2 is an enlarged perspective view of the apparatus shown in FIG. 1.

Referring initially to FIGS. 1 through 3, the apparatus 10 includes an annular strap 20 that has a continuous and unitary length removably positional about a selected portion of the power tool 11. Such a strap 20 maintains a static relationship with the power tool 11 while a drill bit 12 and chuck 13 rotate along an axis centrally aligned with a perimeter of the strap 20 during operating conditions. The strap 20 is formed from elastic material, which is important and advantageous such that the apparatus 10 can conveniently be adjustably positioned about various-sized power tools 11. Of course, the strap 20 may be produced from alternate materials, as is obvious to a person of ordinary skill in the art.

Referring to FIGS. 1 through 4, a plurality of light-emitting sources 21 are directly conjoined, with no intervening elements, to the strap 20 and protrude outwardly therefrom such that the light-emitting sources 21 become equidistantly positioned about the outer perimeter of the strap 20. Such light-emitting sources 21 are directly engaged, with no intervening elements, with the selected portion of the power tool 11 during operating conditions. The light-emitting sources 21 face forwardly and emit a plurality of corresponding light arrays 22 aligned parallel to the drill bit 12 such that the light arrays 22 reflect off a planar work surface 14 being drilled by the power tool 11. Such light-emitting sources 21 are concentrically spaced about the chuck 13 and positioned proximal to the drill bit 12. The light-emitting sources 21 are positioned distally from the trigger 15 of the power tool 11. Each light array 22 is situated in a unique quadrant defined about the drill bit 12, which is essential for allowing a user to simultaneously align the drill bit 12 along a horizontal and a vertical axis.

Figure 6:
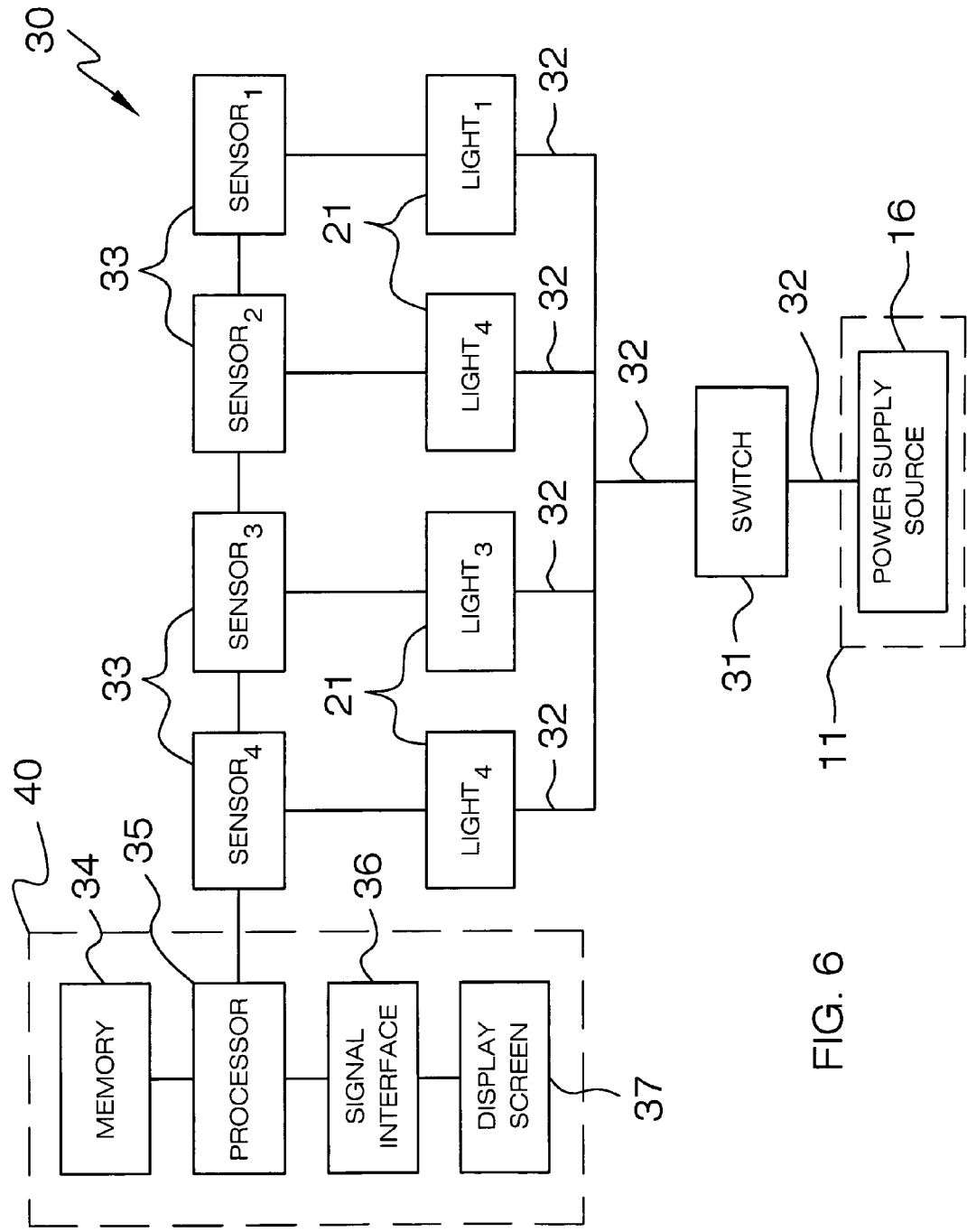
FIG. 6 is a schematic block diagram of the electrically mating mechanism, in accordance with the present invention.

Referring to FIG. 6, a mechanism 30 is included for electrically mating each of the light-emitting sources 21 to a power supply source 16 of the power tool 11 in such a manner that the light-emitting sources 21 advantageously automatically toggle between on and off positions when the user activates a trigger 15 of the power tool 11. The light-emitting sources 21 are simultaneously activated and deactivated by such an electrical mating mechanism 30. The electrically mating mechanism 30 includes a switch 31 and a plurality of electrical leads 32 directly conjoined, with no intervening elements, to the switch 31 and the power supply source 16. Such electrical leads 32 are connected in parallel to the power supply source 16, which is a crucial feature such that a defective one of the light-emitting sources 21 advantageously will not render remaining ones of the light-emitting sources 21 defective during operating conditions.

Referring to FIGS. 4a through 4c, when activated, each light array 22 defines a reflection that has a unique diameter on the planar work surface 14 when the power tool 11 is not aligned perpendicular thereto, as is best shown in FIGS. 4b and 4c. Thus, a user is advantageously and effectively notified to adapt an angle of the power tool 11 such that each light array 22 reflects a substantially identical diameter on the planar work surface 14, as best shown in FIG. 4a. The drill bit 12 is effectively and conveniently aligned perpendicular to the planar work surface 14 when the light-emitting sources 21 are equidistantly spaced from the planar work surface 14.

Referring back to FIG. 6, a plurality of sensors 33 are electrically coupled to the light-emitting sources 32 respectively. It is noted such sensors 33 may include conventional sensors well known in the industry such as optical sensors, infra-red sensors and ultrasonic sensors, for example. The sensors 33 measure a linear distance defined between the light-emitting sources 32 and a target surface 14. Based upon the measured distances, the sensors 33 generate a plurality of control signals corresponding to distance values defined to the target surface 14. In an optimum operating condition, the power tool 11 is centrally and orthogonally aligned with the target surface 14 when the distance values are equal.

The present invention 10 further includes a mechanism 40 for visually displaying a position of a drill bit of the power tool in such a manner that the user can quickly and efficiently align the drill bit with the target surface 14 during operating conditions. Such a position displaying mechanism 40 includes at least one display screen 37 connected to a portion of the power tool 11, a processor 35 and a memory 34 electrically coupled to the processor 35.

The memory 34 includes software instructions for causing the power tool to display the interrelationship of the distance values on the display screen 37 wherein the software instructions performs the steps of: calculating a distance value from each sensor 33 to the target surface 14; performing an arithmetic algorithm with the distance values; determining a position of the drill bit based upon an end value resulting from the arithmetic algorithm; and generating an output signal corresponding to a geometric location of the drill bit defined along an x-axis, y-axis and z-axis.

The mechanism 40 further includes a signal interface circuit 36 electrically coupled to the processor 35 and the display screen 37. Such a signal interface circuit 36 translates and communicates the output signal to the display screen 37 so that a visual representation of the drill bit location becomes displayed on the display screen 37.

In operation, if one sensor 33 reads 58 mm from the target surface 14, another is 62 mm and the two remaining sensors 33 are 60 mm from the target surface, these readings feed signals to the processor and the drill can be manually repositioned until all sensors 33 read 60 mm, for example. Accordingly, the present invention teaches two ways to align the drill bit perpendicular to the target surface 14: a) use the diameter of light arrays to get approximately perpendicular; and then b) use the display screen 37 to ensure accurate alignment. Once accurate alignment is assured, an indicator in the display screen 37 may change from red to green and emit a "beep" sound.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for assisting a user to operate a portable power tool, said apparatus comprising:

an annular strap having a continuous and unitary length removably positional about a selected portion of the power tool, said strap maintaining a static relationship with the power tools while a drill bit and chuck rotate along a axis centrally aligned with a perimeter of said strap during operating conditions;

a plurality of light-emitting sources directly conjoined to said strap and protruding outwardly therefrom such that said light-emitting sources become equidistantly positioned about the outer perimeter of said strap, said light-emitting sources facing forwardly and emitting a plurality of corresponding light arrays aligned parallel to the drill bit such that said light arrays reflect off a planar work surface being drilled by the power tool;

means for electrically mating each said light-emitting sources to a power supply source of the drill bit in such a manner that said light-emitting sources automatically toggle between on and off positions when the user activates a trigger of the power tool;

a plurality of sensors electrically coupled to said light-emitting sources respectively, said sensors measuring a linear distance defined between said light-emitting sources and a target surface, said sensors generating a plurality of control signals corresponding to distance values wherein said power tool is centrally and orthogonally aligned with the target surface when the distance values are equal; and means for visually displaying a position of a drill bit of the power tool in such a manner that the user can centrally align the drill bit with the target surface during operating conditions;

wherein each said light array defines a reflection having a unique diameter on the planar work surface when the power tool is not aligned perpendicular thereto and thereby notifies the user to adapt an angle of the power tool such that each said light array reflects a substantially identical diameter of the planar work surface, the drill bit being aligned perpendicular to the planar work surface when said light-emitting sources are equidistantly spaced from the planar work surface.

2. The apparatus of claim 1, wherein said position displaying means comprises:

at least one display screen connected to a portion of the power tool;

a processor;

a memory electrically coupled to said processor, said memory including software instructions for causing said power tool to display the interrelationship of the distance values on said display screen, said software instructions performing the steps of:

calculating a distance value from each said sensor to the target surface, performing an arithmetic algorithm with the distance values, determining a position of the drill bit based upon an end value resulting from the arithmetic algorithm, and generating an output signal corresponding to a geometric location of the drill bit defined along an x-axis, y-axis and z-axis; and a signal interface circuit electrically coupled to said processor and said display screen, said signal interface circuit translating and communicating said output signal to said display screen so that a visual representation of the drill bit location becomes displayed on said display screen.

3. The apparatus of claim 1, wherein said electrically mating means comprises:

a switch; and a plurality of electrical leads directly conjoined to said switch and the power supply source, said electrical leads being connected in parallel to the power supply source such that a defective one of said light-emitting sources will not render remaining ones of said light-emitting sources defective during operating conditions.

4. The apparatus of claim 1, wherein said strap is formed from elastic material such that said apparatus can be adjustably positioned about various-sized power tools.

5. The apparatus of claim 1, wherein said light-emitting sources are concentrically spaced about the chuck and positioned proximal to the drill bit.

6. The apparatus of claim 1, wherein each said light arrays is situated in a unique quadrant defined about the drill bit.

7. An apparatus for assisting a user to operate a portable power tool, said apparatus comprising:

an annular strap having a continuous and unitary length removably positional about a selected portion of the power tool, said strap maintaining a static relationship with the power tools while a drill bit and chuck rotate along a axis centrally aligned with a perimeter of said strap during operating conditions;

a plurality of light-emitting sources directly conjoined to said strap and protruding outwardly therefrom such that said light-emitting sources become equidistantly positioned about the outer perimeter of said strap, said light-emitting sources facing forwardly and emitting a plurality of corresponding light arrays aligned parallel to the drill bit such that said light arrays reflect off a planar work surface being drilled by the power tool;

means for electrically mating each said light-emitting sources to a power supply source of the drill bit in such a manner that said light-emitting sources automatically toggle between on and off positions when the user activates a trigger of the power tool, wherein said light-emitting sources are simultaneously activated and deactivated by said electrical mating means;

a plurality of sensors electrically coupled to said light-emitting sources respectively, said sensors measuring a linear distance defined between said light-emitting sources and a target surface, said sensors generating a plurality of control signals corresponding to distance values wherein said power tool is centrally and orthogonally aligned with the target surface when the distance values are equal; and means for visually displaying a position of a drill bit of the power tool in such a manner that the user can centrally align the drill bit with the target surface during operating conditions;

wherein each said light array defines a reflection having a unique diameter on the planar work surface when the power tool is not aligned perpendicular thereto and thereby notifies the user to adapt an angle of the power tool such that each said light array reflects a substantially identical diameter of the planar work surface, the drill bit being aligned perpendicular to the planar work surface when said light-emitting sources are equidistantly spaced from the planar work surface.

8. The apparatus of claim 7, wherein said position displaying means comprises:

at least one display screen connected to a portion of the power tool;

a processor;

a memory electrically coupled to said processor, said memory including software instructions for causing said power tool to display the interrelationship of the distance values on said display screen, said software instructions performing the steps of:

calculating a distance value from each said sensor to the target surface, performing an arithmetic algorithm with the distance values, determining a position of the drill bit based upon an end value resulting from the arithmetic algorithm, and generating an output signal corresponding to a geometric location of the drill bit defined along an x-axis, y-axis and z-axis; and a signal interface circuit electrically coupled to said processor and said display screen, said signal interface circuit translating and communicating said output signal to said display screen so that a visual representation of the drill bit location becomes displayed on said display screen.

9. The apparatus of claim 7, wherein said electrically mating means comprises:
   a switch; and
   a plurality of electrical leads directly conjoined to said switch and the power supply source, said electrical leads being connected in parallel to the power supply source such that a defective one of said light-emitting sources will not render remaining ones of said light-emitting sources defective during operating conditions.

10. The apparatus of claim 7, wherein said strap is formed from elastic material such that said apparatus can be adjustably positioned about various-sized power tools.

11. The apparatus of claim 7, wherein said light-emitting sources are concentrically spaced about the chuck and positioned proximal to the drill bit.

12. The apparatus of claim 7, wherein each said light arrays is situated in a unique quadrant defined about the drill bit.

13. An apparatus for assisting a user to operate a portable power tool, said apparatus comprising:
   an annular strap having a continuous and unitary length removably positional about a selected portion of the power tool, said strap maintaining a static relationship with the power tools while a drill bit and chuck rotate along a axis centrally aligned with a perimeter of said strap during operating conditions;
   a plurality of light-emitting sources directly conjoined to said strap and protruding outwardly therefrom such that said light-emitting sources become equidistantly positioned about the outer perimeter of said strap, wherein said light-emitting sources are directly engaged with the selected portion of the power tool during operating conditions, said light-emitting sources facing forwardly and emitting a plurality of corresponding light arrays aligned parallel to the drill bit such that said light arrays reflect off a planar work surface being drilled by the power tool;
   means for electrically mating each said light-emitting sources to a power supply source of the drill bit in such a manner that said light-emitting sources automatically toggle between on and off positions when the user activates a trigger of the power tool, wherein said light-emitting sources are simultaneously activated and deactivated by said electrical mating means;
   a plurality of sensors electrically coupled to said light-emitting sources respectively, said sensors measuring a linear distance defined between said light-emitting sources and a target surface, said sensors generating a plurality of control signals corresponding to distance values wherein said power tool is centrally and orthogonally aligned with the target surface when the distance values are equal; and
   means for visually displaying a position of a drill bit of the power tool in such a manner that the user can centrally align the drill bit with the target surface during operating conditions;
   wherein each said light array defines a reflection having a unique diameter on the planar work surface when the power tool is not aligned perpendicular thereto and thereby notifies the user to adapt an angle of the power tool such that each said light array reflects a substantially identical diameter of the planar work surface, the drill bit being aligned perpendicular to the planar work surface when said light-emitting sources are equidistantly spaced from the planar work surface.

14. The apparatus of claim 13, wherein said position displaying means comprises:
   at least one display screen connected to a portion of the power tool;
   a processor;
   a memory electrically coupled to said processor, said memory including software instructions for causing said power tool to display the interrelationship of the distance values on said display screen, said software instructions performing the steps of:
      calculating a distance value from each said sensor to the target surface,
      performing an arithmetic algorithm with the distance values,
      determining a position of the drill bit based upon an end value resulting from the arithmetic algorithm, and
      generating an output signal corresponding to a geometric location of the drill bit defined along an x-axis, y-axis and z-axis; and
   a signal interface circuit electrically coupled to said processor and said display screen, said signal interface circuit translating and communicating said output signal to said display screen so that a visual representation of the drill bit location becomes displayed on said display screen.

15. The apparatus of claim 13, wherein said electrically mating means comprises:
   a switch; and
   a plurality of electrical leads directly conjoined to said switch and the power supply source, said electrical leads being connected in parallel to the power supply source such that a defective one of said light-emitting sources will not render remaining ones of said light-emitting sources defective during operating conditions.

16. The apparatus of claim 13, wherein said strap is formed from elastic material such that said apparatus can be adjustably positioned about various-sized power tools.

17. The apparatus of claim 13, wherein said light-emitting sources are concentrically spaced about the chuck and positioned proximal to the drill bit.

18. The apparatus of claim 13, wherein said light-emitting sources are positioned distally from the trigger of the power tool.

19. The apparatus of claim 13, wherein each said light arrays is situated in a unique quadrant defined about the drill bit.

* * * * *